A. A. NOYES AND C. L. BURDICK.
PROCESS OF TREATING GAS MIXTURES CONTAINING NITROGEN OXIDES.
APPLICATION FILED SEPT. 19, 1918.

1,433,969. Patented Oct. 31, 1922.

Inventors,
Arthur A. Noyes,
Charles L. Burdick
By Byrnes Townsend & Breckenstein
Attorneys Patented Oct. 31, 1922.

1,433,969

UNITED STATES PATENT OFFICE.

ARTHUR A. NOYES, OF BOSTON, MASSACHUSETTS, AND CHARLES L. BURDICK, OF SHEFFIELD, ALABAMA.

PROCESS OF TREATING GAS MIXTURES CONTAINING NITROGEN OXIDES.

Application filed September 19, 1918. Serial No. 254,770.

*To all whom it may concern:*

Be it known that we, (1) ARTHUR A. NOYES and (2) CHARLES L. BURDICK, citizens of the United States, residing at (1) Boston, (2) Sheffield, in the counties of (1) Suffolk, (2) Colbert, and State of (1) Massachusetts, (2) Alabama, have invented certain new and useful Improvements in Processes of Treating Gas Mixtures Containing Nitrogen Oxides, of which the following is a specification.

This invention relates to improvements in the treatment of gas mixtures containing an oxide or oxides of nitrogen and to the recovery of such oxides, either as nitric acid or in other utilizable form. The invention is based primarily upon the observation that the oxidation of nitric oxide (NO) to nitrogen peroxide ($N_2O_4$ or $NO_2$) by means of atmospheric oxygen may be greatly accelerated by means of certain substances, notably certain highly absorptive carboniferous materials hereinafter described, which substances are capable of functioning as catalyzers for this particular reaction. Our invention is applicable to the treatment of nitrous gases or gas-mixtures arising from various operation, including the catalytic oxidation of ammonia, the fixation of atmospheric nitrogen by the arc process, and the gas effluents from nitric acid manufacture and from organic nitrating operations. As is well known, most of these operations yield a rather dilute mixture of nitric oxide and higher oxide of nitrogen with the components of atmospheric air. In case the gases are derived from the oxidation of ammonia, a corresponding proportion of moisture may also be present, owing to the oxidation of the hydrogen component of the ammonia.

As is well known, the absorption of such nitrous gases in the manner now practiced, including their conversion into nitric acid, involves the provision of very large and extremely costly tower or scrubbing systems. This is largely due to the fact that the operation involved is not a simple scrubbing or absorption of a water-soluble gas, but involves certain chemical reactions which may be for convenience be expressed by the following equations:

(1) (Oxidation) $2NO + O_2 = 2NO_2$.
(2) (Hydrolysis) $3NO_2 + H_2O = 2HNO_3 + NO$.

It will be observed that in the production of nitric acid by the hydrolytic reaction (2), one-third of the nitrogen reverts to the form of nitric oxide (NO), which must be re-oxidized to nitrogen peroxide ($NO_2$) before it can again react with water. It is this constant reversion of a portion of the oxidized product ($NO_2$) to a state of lower oxidation (NO) which renders necessary the use of the present extensive and costly recovery systems.

Our experimental studies of the above reactions have demonstrated that the slowness of the absorption of the gases as heretofore practiced is due mainly to the low velocity of the oxidation reaction (1). Unfavorable equilibrium conditions in the hydrolytic reaction (2) are also partially responsible for the difficulties in absorption; for in presence of even relatively very small proportions of nitric oxide, the transformation of nitrogen peroxide into nitric acid of more than moderate concentration is inhibited. In order therefore to improve the conditions of absorption, it is necessary not only to accelerate the oxidation reaction, but also to render it as nearly complete as possible.

We have discovered that both of these results may be accomplished by the use of a suitable catalyst which has a specific accelerating effect in the reaction expressed in equation (1). While our invention in its broader aspects is not limited to the employment of any particular catalyst, those which we prefer at present are carboniferous in character, and comprise either charcoal derived from the shell of certain nuts, including the cocoanut and cohune nut; or less active forms of carbons which have been "activated" by suitable treatment and thereby brought to a degree of activity of the same general order of magnitude. The activation of the carboniferous catalyzer, derived for example from maple or other deciduous woods, may be accomplished by known methods of treatment, including treatment by steam or by a limited proportion of air at an elevated temperature; or by impregnation or coating with materials containing platinum, iridium, or analogous elements of the platinum group, or oxides or other compounds of tungsten, vanadium, uranium, or the like.

It is characteristic of the catalyzers which we have found effective for the purposes of this invention, that they possess a high degree of absorptive capacity; that is to say, they are capable of occluding, absorbing, or absorbing relatively large volumes of the oxides of nitrogen. As an illustration of the catalytic properties of these active materials, it was found in one of our experiments that in presence of granulated cocoanut charcoal the time required to secure 90% oxidation of the nitric oxide in a gas containing 1.39% nitric oxide, 2.96% oxygen, 0.1% water was of the order of 0.8 seconds; whereas in presence of inert and inactive materials the time required for a similar oxidation of the same mixture was of the order of 400 seconds. In another instance, with a gas containing 2.22% nitric oxide, 2.76% oxygen and 5.6% water, and maintained at 60° C., the time necessary to secure 90% oxidation in the presence of a highly absorptive and active coke product was of the order of 3 seconds; whereas in the presence of inert material the time required to secure a like oxidation was of the order of 600 seconds. The presence of large quantities of moisture in the gases has a tendency to reduce somewhat the activity of the catalysts; but not to such an extent with these catalysts as to make dehydration of the gases necessary.

Such porous materials as pumice, coke, and charcoal have been found to possess some catalytic activity for the reaction, but their activity is of a much lower order than the foregoing.

In increasing the state of oxidation of nitrous gases entraining considerable amounts of aqueous or nitric acid vapors, it is desirable and preferable for the purpose of continuous operation to maintain the temperature of the catalyst above that which corresponds to the vapor-pressures which such entrained substances would have if converted to the liquid state. This statement is not to be construed, however, as limiting the utility of these catalysts to temperatures greater than those coresponding to the vapor-pressures of the entrained substances; for the reactive and absorptive properties of the catalyst may be considerable at lower temperatures. Nor is it implied that the products of reaction and combination are necessarily evolved from the catalyst, as they may remain therein subject to subsequent recovery processes. More particularly in the case of relatively dilute gas-mixtures, it may be advisable to pre-heat the gases entering the catalytic chambers to a sufficient temperature to avoid all danger of the precipitation of nitric acid on the catalyst.

In this connection it should be pointed out that previous investigators and experimenters have found that, although the rate of combination of nitric oxide and oxygen is reasonably rapid when the gases are concentrated, yet at the low concentrations obtaining in such gas-mixtures as are produced by the oxidation of ammonia or by the arc process of nitrogen fixation, the reaction normally takes place very slowly. The rate of combination in a given gas-mixture has been found to increase with increase of pressure; but (contrary to the rule found general for almost all chemical reactions) it has been found to increase in velocity as the temperature is diminished. Because of the exactly opposite influence of these two common agencies for the acceleration of chemical reactions, namely, increase of pressure and temperature, it could not be predicted what would be the influence of contact materials, nor could it be foretold from the known absorptive properties of a given form of carbon that it would serve as an accelerator in this reaction.

One form of apparatus suitable for the practice of our invention is illustrated in the accompanying drawing, wherein:—

Figure 1:
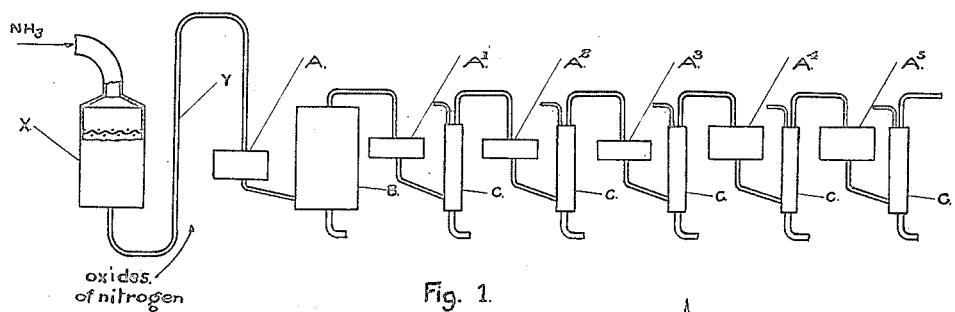
Figure 1 is a diagrammatic elevation showing a plurality of oxidizing vessels with intermediate absorption towers.

Referring to Figure 1, X represents any suitable source of the oxide of nitrogen, for example, a catalytic chamber for the oxidation of ammonia. The gases emerging from X at a relatively high temperature (say 650° C·) are conducted to the first oxidizing chamber A, being cooled in transit through the connecting pipe Y to a temperature below 140°–150° C., this being the temperature at which nitrogen peroxide begins to undergo appreciable dissociation. In case of gases relatively rich in higher oxides of nitrogen, the temperature should not be permitted to rise to a point at which material oxidation of carbon takes place. The several oxidizing chambers are filled with catalytic material, preferably a carboniferous material of the nature specified above, and the gases are retained therein for a period permitting the oxidation reaction (1) to proceed approximately to completion.

The temperature of the gases will tend to rise in the course of their passage through the first oxidizing chamber, owing to the exothermic character of the reaction; and this tendency will persist to a diminishing degree in the second and following oxidizing chambers where several such chambers are connected in series in the line of gas-flow. The operation is preferably so controlled that the temperature of the effluent gases from the first oxidizing chamber does not exceed 140–150° C. The gases flow directly from the first oxidizing chamber A to a cooler or condenser B, the function of which is to secure proper cooling, and to allow opportunity for the hydrolytic reaction (2) to proceed approximately to equilibrium. In the case of nitrous gases from processes other than that of ammonia oxidation, that is to say, from those processes in which large quantities of water vapor are not entrained by the gas-mixture, the first oxidation chamber A and the condenser B may be omitted.

Assuming that nitric acid is to be prepared, the nitrous gases flow from the condenser B through a series of oxidation chambers, indicated as five in number and designated $A^1$, $A^2$, $A^3$, $A^4$, and $A^5$. These oxidation chambers are filled with a catalyst as described in connection with chamber A and may advantageously increase somewhat in size along the line of gas-flow, to correspond approximately to the decreased concentration of the nitric oxide in the gas-mixture. Absorbing towers C are interposed between the several oxidizing chambers, and serve to permit the hydrolytic reaction (2) to take place, being supplied with aqueous nitric acid or other suitable medium for the absorption of nitrogen peroxide. It will be understood that the oxidation chambers are so designed that in transit through them sufficient opportunity is accorded for the nitric oxide present in the nitrous gases to become largely oxidized to nitrogen peroxide. In like manner the absoption chambers are so designed that the time of transit of the gases through them is substantially equal to, but not in great excess of, the time required for the hydrolytic reaction (2) to proceed to equilibrium.

Figure 2:
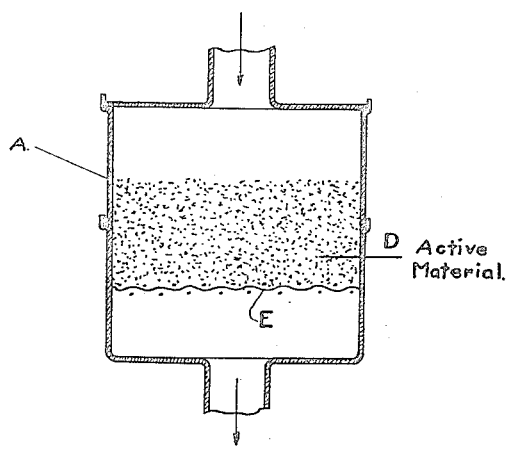
Figure 2 is a vertical central section of one form of oxidizer.
Figure 3:
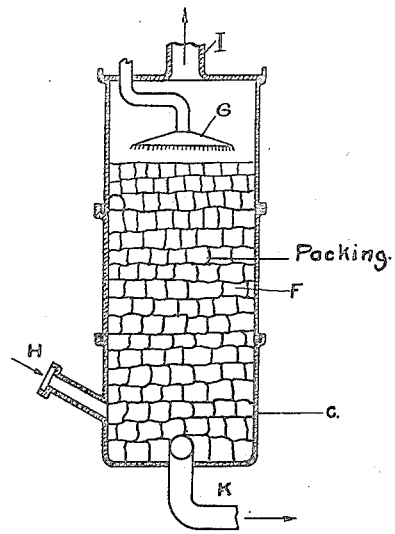
Figure 3 is a similar view of one form of absorber.

Our invention is not limited to any particular form of oxidizing chamber or absorbing chamber. A form of oxidizing chamber which has been found suitable for the purpose of the invention is shown in Figure 2, and comprises a stoneware vessel A containing the active material D, which may conveniently be supported upon a suitable acid proof frame E. The absorption vessels may comprise acid-proof towers C as shown in Figure 3, filled with packing material F and provided with a distributing head G for the inflowing nitric acid or other absorbing medium. H indicates the gas inlet and I the gas outlet of the absorbing tower. The acid flowing out at K will of course be re-circulated through the system until the desired concentration is reached.

We have found that by the use of an appropriate catalyst the capacity of the oxidation chambers may be reduced to a very small fraction of the size of chambers functioning without a catalyst. For example, an oxidation chamber filled with granular cocoanut charcoal, or other carboniferous catalyst of like order of activity may be of a size of the order of 1/5 to 1/1000 of that of chambers without a catalyst. Thus the oxidation and absorption chambers may in some instances be of approximately the same size, the total size of the absorbing system being but a small fraction of that required for the operation as heretofore practiced.

Our invention is not limited to the manufacture of nitric acid; for, as will be readily understood, the nitrogen peroxide resulting from the catalytic oxidation may be utilized for other purposes. Thus, for example, it may be absorbed in caustic soda or other alkaline reagent for the production of the corresponding nitrates and nitrites; or the nitrogen oxide may be collected directly by refrigerating the effluent gas under proper conditions. In such cases a system comprising a series of oxidizing vessels with interposed absorbing towers would, of course, not be required.

By the expression "an active catalyst" employed in certain of the claims, we intend to define a catalyst which is capable of diminishing the time required for a given amount of reaction to take place, under given conditions of pressure, temperature, and concentration, to at least one-fifth of its normal value (that is, of its value when the reaction is not catalyzed).

We claim:—

1. In a process of treating gas-mixtures containing nitric oxide and oxygen, the step which consists in effecting the oxidation of nitric oxide to nitrogen peroxide in presence of an active carboniferous catalyst for the said reaction.

2. Process of preparing nitric acid from gas-mixtures containing nitric oxide and oxygen, comprising subjecting the said mixture to catalytic oxidation by means of an active carboniferous catalyst for the said reaction, and then to the action of an aqueous medium capable of absorbing the nitrogen peroxide resulting from said oxidation.

3. Process of preparing nitric acid from gas-mixtures containing nitric oxide and oxygen, comprising alternately and repeatedly subjecting the said mixture to catalytic oxidation by means of an active carboniferous catalyst, and to the action of an aqueous medium capable of absorbing the nitrogen peroxide resulting from said oxidation.

In testimony whereof, we affix our signatures.

ARTHUR A. NOYES.
CHARLES L. BURDICK.